US009759614B2

(12) United States Patent
Moore et al.

(10) Patent No.: US 9,759,614 B2
(45) Date of Patent: *Sep. 12, 2017

(54) METHOD AND APPARATUS TO DETERMINE USER PRESENCE

(71) Applicant: Intel Corporation, Santa Clara, CA (US)

(72) Inventors: Victoria C. Moore, Phoenix, AZ (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,093

(22) Filed: Apr. 3, 2015

(65) Prior Publication Data

US 2016/0006763 A1 Jan. 7, 2016

Related U.S. Application Data

(63) Continuation of application No. 13/992,001, filed as application No. PCT/US2011/067573 on Dec. 28, 2011, now Pat. No. 9,018,585.

(51) Int. Cl.
| | |
|---|---|
| *G01J 5/02* | (2006.01) |
| *G06F 13/14* | (2006.01) |
| *G06F 21/00* | (2013.01) |
| *G06F 21/31* | (2013.01) |
| *G06F 11/30* | (2006.01) |

(52) U.S. Cl.
CPC ............... *G01J 5/02* (2013.01); *G06F 13/14* (2013.01); *G06F 21/00* (2013.01); *G06F 21/31* (2013.01); *G06F 11/3058* (2013.01); *G06F 2221/2133* (2013.01); *G06F 2221/2139* (2013.01)

(58) Field of Classification Search
CPC .. G01J 5/02; G06F 13/14; G06F 21/00; G06F 11/3058; G06F 21/31
See application file for complete search history.

(56) References Cited

U.S. PATENT DOCUMENTS

| | | | | |
|---|---|---|---|---|
| 8,629,938 | B2 * | 1/2014 | Wong | G06F 3/011 340/540 |
| 2008/0158000 | A1 * | 7/2008 | Mattrazzo | H04M 1/05 340/4.4 |
| 2010/0066821 | A1 * | 3/2010 | Rosener | G06F 3/011 348/77 |
| 2011/0080529 | A1 * | 4/2011 | Wong | G06F 3/011 348/734 |
| 2011/0180686 | A1 * | 7/2011 | Iwai | G01S 17/026 250/205 |

* cited by examiner

*Primary Examiner* — David Porta
*Assistant Examiner* — Faye Boosalis
(74) *Attorney, Agent, or Firm* — Hanley, Flight & Zimmerman, LLC

(57) ABSTRACT

According to some embodiments, a method and apparatus are provided to receive a first signal from a sensor, determine that a user is present based on the received first signal, receive a second signal from the sensor, and determine if the user is still present based on the received second signal.

10 Claims, 3 Drawing Sheets

METHOD AND APPARATUS TO DETERMINE USER PRESENCE

BACKGROUND OF THE INVENTION

A computer session is an interactive information interchange between two or more computing devices or between a computer and user. Each particular session may have a time-out property to specify a time-out period assigned to the particular session, for example, the time-out period may be 5 minutes. Therefore, if a user does not refresh or request a page within the time-out period, the session ends.

Users who shop or bank online often find that while they view other web pages or are distracted from their computer, their session is timed out. A timed out session requires a user to not only re-authenticate but the user may have lost any information that had been previously entered.

DETAILED DESCRIPTION OF EXAMPLE EMBODIMENTS

Figure 1:
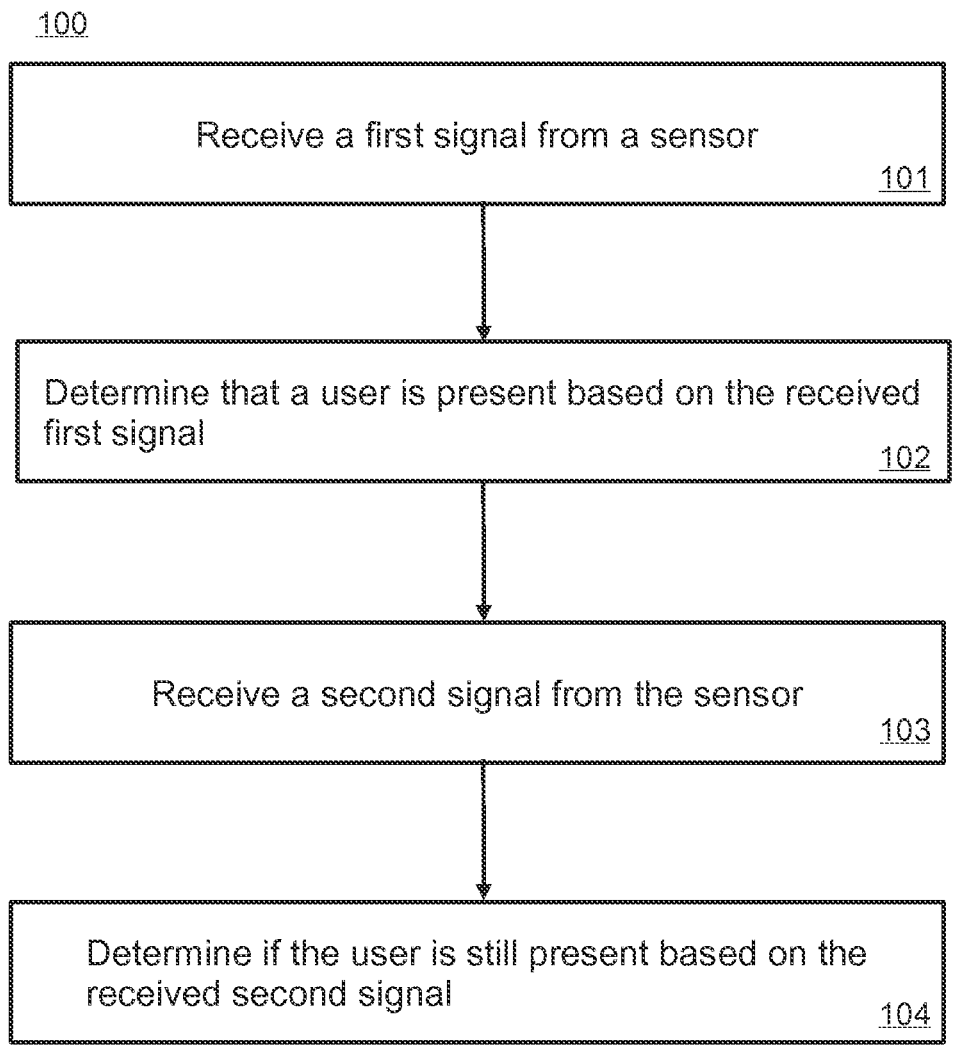
FIG. 1 illustrates a method according to some embodiments.

Referring now to FIG. 1, an embodiment of a method 100 is illustrated. The method 100 may relate to determining a presence of a particular person in proximity to a computing device by establishing a user presence session ("UPS") which maintains an assertion of a user presence from a point when a user's authentication is established until the user's proximity with the computing device terminates. The method 100 may be performed by an apparatus such as that described with respect to FIG. 3. Furthermore, the method 100 may be embodied on a non-transitory computer-readable medium that stores processor-executable instructions that can be executed by a processor.

At 101, a first signal is received from a sensor. The sensor may comprise, but is not limited to, a Bluetooth sensor, a near field communication sensor, an infrared sensor, a camera, or a microphone. In some embodiments, the sensor may be part of a sensor hub, such as sensor hub 310 as described with respect to FIG. 3.

For illustrative purposes, and to aid in understanding features of the specification, an example will now be introduced. This example is not intended to limit the scope of the claims. For example, when a user sits in front of his computer, an infrared sensor, having an emitter, sends an infrared beam which is reflected off of the user. The infrared reflection (e.g., signal) associated with the user is received at an apparatus such as a computer device or a separate device electrically coupled to the computing device.

Next at 102, a user is determined to be present based on the received first signal. In some embodiments, once a user is determined to be present, a UPS automatically begins. The UPS may end once a user is determined to not be present. The determination that the user is present may be referred to as an assertion. In some embodiments, the assertion may be verified by a remote verifier as described in more detail with respect to FIG. 2 and FIG. 3. The UPS may be controlled by a UPS policy specified by a platform owner (e.g., an owner of the computing device), a software package, or a website.

Returning to the above example, the received signal, which may indicate an amount of energy received from the emitter, may further indicate a presence of a user at the computing device. Since a user was determined to be present, a UPS automatically begins.

A second signal is received from the sensor at 103. In some embodiments, sensor data will be received at periodic intervals and therefore the second signal may be received at a predetermined time from the first signal. For example, each signal may be received at 5 second intervals.

At 104, a determination is made if the user is still present based on the received second signal. Returning to the above example, a second signal associated with the infrared sensor is received. If the infrared sensor indicates no change in infrared energy after a 5 second interval, then it may be determined that the user has not moved and the UPS will continue. If, however, there is a change in infrared energy after the 5 second interval, then it may be determined that the user has moved or has been replaced by a different user and the UPS will be terminated. According to some embodiments, ending a session based on a user's proximity may prevent a user from having to re-authenticate or from losing previously entered information.

In some embodiments, a third signal is received from a second sensor, and the determining if the user is still present may be based on the received second signal and the received third signal. For example, a camera may be used to provide a third signal associated with facial recognition and the third signal may be used in conjunction with the infrared signal. In this embodiment, a computing device may receive a signal from both the camera and the infrared sensor and the determination if the user is still present may be based on both the received signal from the camera and the received signal from the infrared sensor. Combining signals from different sensors may make it more difficult for potential attackers as they would need to acquire attack tools for each and every sensor.

Figure 2:
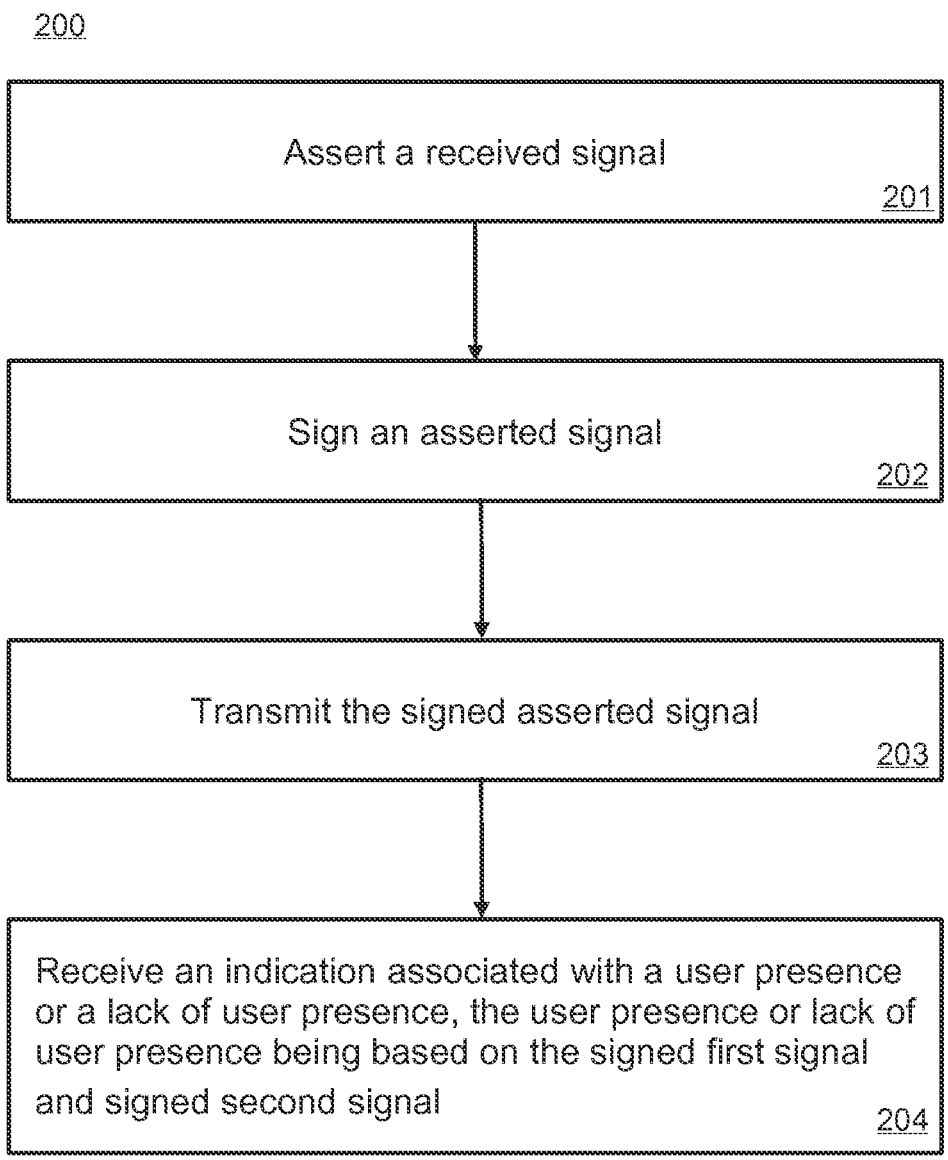
FIG. 2 illustrates a method according to some embodiments.

Now referring to FIG. 2, an embodiment of a method 200 is illustrated. In some embodiments, the method 200 relates to determining a veracity that a user is present based on received signals.

At 201, a received signal is asserted. For example, the 1st, 2nd, and 3rd signals, as described with respect to FIG. 1 may each be signed. As stated previously, an assertion is a determination that a user is present at a computing device. Received signals may be received at a coprocessor which functions as a secure element in a computing device to aggregate the received signals and to calculate a reliable assertion of user presence. The assertion may contain several pieces of information to ensure that user presence can be trusted by a network connected recipient such as information associated with one or more sensors. In some embodiments, the assertion is based on a proximity vector by aggregating the sensor inputs to calculate a likely proximity vector and then the various proximity vectors are combined to produce the assertion of user presence.

At 202 an asserted signal is signed. The veracity of the assertion can be established by signing the assertion using an embedded Enhanced Privacy Identifier ("EPID"). The EPID may be a machine specific code that is associated with a specific computing device. For example, the EPID may relate to a hardware specific code associated with a coprocessor or type of coprocessor. Furthermore, a timestamp may be included in the EPID so that a recipient of the signed assertion can enforce a policy of trusting the signed assertion for a limited period of time before requiring a newly signed assertion. The EPID may function as a key that is bound to the coprocessor. By doing so, the EPID may not reveal Personally Identifiable Information ("PII") when user presence information is disclosed. The EPID may only reveal an attested user presence.

Several attributes contained in the assertion may only be known to the coprocessor and therefore, these values may be attested by the EPID value that is embedded in the coprocessor chipset hardware. Namely, the EPID attestation may be associated with the coprocessor that implements logic associated with the sensors used to establish the UPS (e.g., a UPS sensor), a timestamp from a trusted time source also implemented in coprocessor chipset hardware, a UPS assertion value itself (Boolean, or proximity value or both) and optionally user credentials of the user and/or domain that was authenticated. If the coprocessor also implements user authentication primitives, then a binding between a strong authentication event of the user and the beginning of a UPS are asserted by the coprocessor and attested by the EPID. In some embodiments, this may create a strong assertion of authenticated user presence. The assertion provides a "trusted path" connection between a physical sensor device and/or a sensor hub and the co-processor directly, via a platform bus (e.g., I2C, SMBUS, LPC, GPIO, USB, XHCI, Thunderbolt, etc.) or via a sensor/communications hub. In some embodiments this may enhance a communication hub's ability to resist software attacks waged by malware on the processor and/or memory. The coprocessor may function as a secure element that is connected to a plurality of physical sensors.

Next, at 203 the signed asserted signal is transmitted. The signed asserted signal may be transmitted to a remote verifier. The signed asserted signal may be referred to as an "attestation". The remote verifier may confirm a presence or lack of presence of a user at a computing device. The remote verifier may use information signed by the EPID, information from the signal, and/or information from the timestamp to determine a user presence or lack of user presence. In some embodiments, the timestamp may be associated with a UPS sensor policy describing a UPS presence granularity. For example, a UPS sensor might have an internal refresh rate of 1/0.25 second and this refresh rate may be included with the timestamp. This UPS sensor policy may change depending on the computing devices power conservation state. Inclusion, of the UPS sensor policy in the attestation may enable the remote verifier to better manage appropriate risk mitigation responses given the UPS sensor capabilities.

When communicating with a remote verifier (e.g., where authentication is external to a coprocessor) the assertion of an authenticated user presence may be made by a UPS sensor driver software. The UPS sensor driver software may bind a user's credential information with an otherwise anonymous assertion of user presence made by the coprocessor's logic. The coprocessor exposes an attested UPS presence to the UPS sensor driver software. The UPS sensor driver software may many a UPS assertion with user authentication assertions and then maintains a publish & subscribe relationship with multiple subscriber domains. Subscribers may be able to view platform attested UPS values to verify a user presence at computing device. Subscribers may be remote to a computing platform or may be onboard the computing platform as will be described with respect to FIG. 3. Each subscriber domain may establish a different credential that corresponds to a same physical user. Hence, a single assertion of user authentication and corresponding UPS assertion could map to multiple credentials. The assertion of a presence of a specific user at a specific domain is established by digitally signing the user's credential and the UPS assertion using the user's credential. For example, a user's session with a bank's web page may be monitored by an external service to provide some security to the bank that a user is not only authenticated but that the user is still in proximity to the computing device that authenticated the user.

The UPS sensor driver software may maintain a domain specific refresh/polling policy. A new assertion of presence can be delivered to a respective domain according to an interval that is less than or equal to an associated sensor's native refresh granularity. Doing so less frequently may be desired to optimize network bandwidth. In some embodiments, UPS sensor driver software could be flexibly divided between the software implemented by a processor and the logic in the coprocessor. For example, user authentication could occur in the coprocessor where a mapping between user identity and user presence is made, but the association of the authenticated UPS assertion with a domain specific identity provider/consumer could be performed in the UPS sensor driver software implemented by the processor.

At 204, an indication associated with a user presence or a lack of user presence is received, the user presence or lack of user presence being based on the transmitted signed first signal and signed second signal. The indication is associated with the user of the computing device and may be received from a remote verifier.

Figure 3:
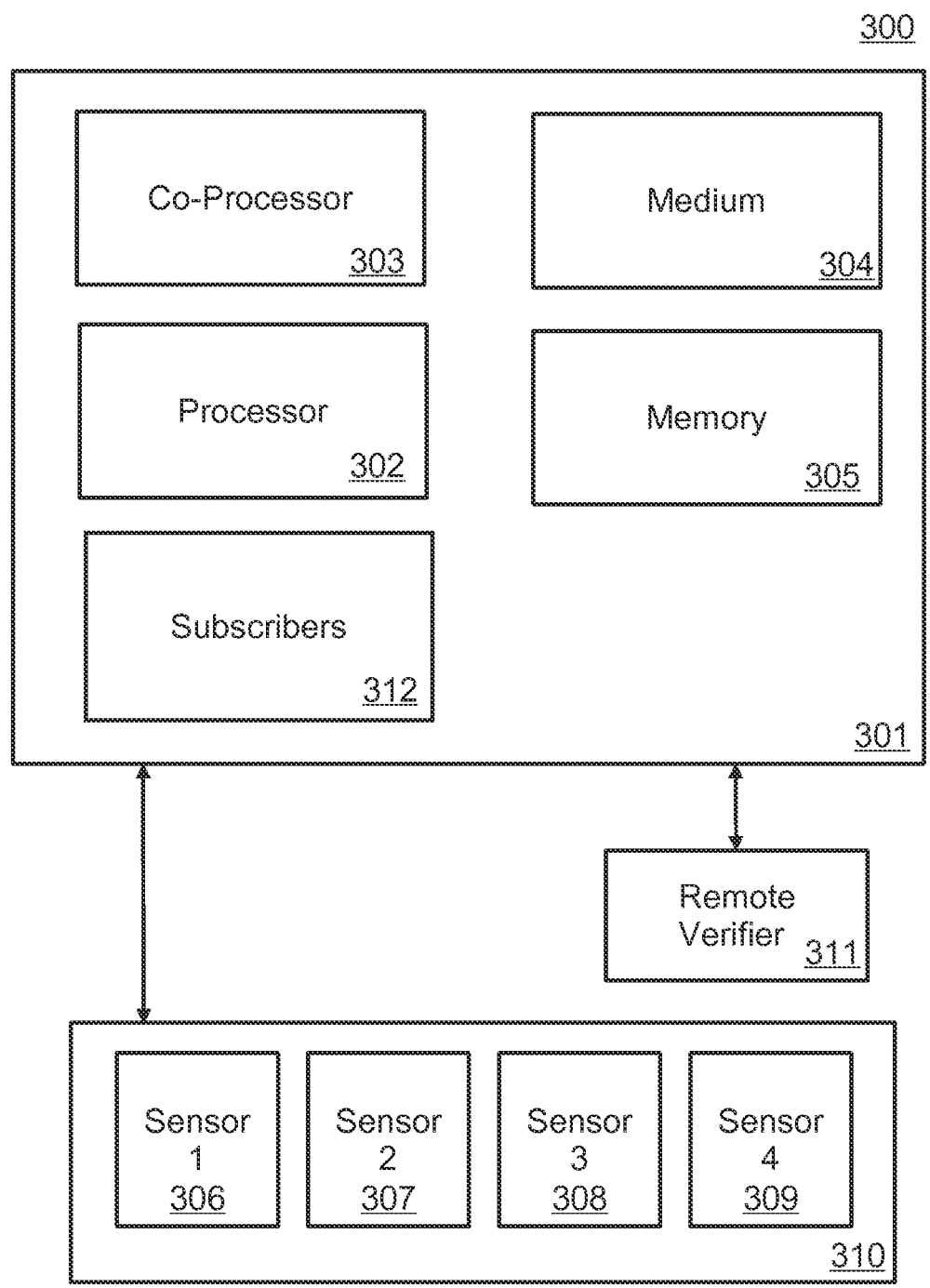
FIG. 3 illustrates a system according to some embodiments.

Now referring to FIG. 3, an embodiment of a system 300 is illustrated. The system 300 comprises a computing device 301, a sensor array 310, subscribers 312, and a remote verifier 311. While the sensor array 310 is illustrated as being separate from the computing device, in some embodiments the sensor array 310 may be integrated into the computing device. Subscribers 312 may be able to view platform attested UPS values to verify a user presence at computing device. Subscribers may be remote to the computing device 301 (such as a remote verifier 311) but in some embodiments, subscribers 312 may also be local to the computing device 301 such as a peripheral that is in electrical communication with the platform or within the coprocessor or other onboard chipset.

The sensor array 310, as illustrated, comprises a plurality of sensors 306/307/308/309. However, in some embodiments the sensor array 310 may comprise a single sensor. The sensor array 310 may transmit one or more signals to the computing device 301. The sensor array 310 may feed raw sensory input to a coprocessor 303 to determine a UPS. Raw sensory input that is received by the coprocessor 303 may be evaluated to determine a probability that an authenticated user is present or that a user presence has been disrupted. Raw inputs from some sensors such as, but not limited to, an NFC radio that may detect a transmission that is unique to a specific user. For sensors such as the NFC radio, there is a high probability that the intended user will be carrying the transmitter. For example, a wristwatch or smart phone could transmit a unique value over an NFC channel to the NFC radio in the sensor array 310. In some embodiments, a Bluetooth Low Energy ("BLE") radio may be used as an alternative to the NFC radio. The BLE has similar security properties to NFC but comprises a longer range than NFC. For example, BLE can be measured in multi-meter range, while NFC may only have a range of 10s of millimeters. Infrared and ultrasonic comprise a range of 10s of centimeters and do not require that a user has to carry a pairing device (e.g. a radio). An infrared sensor (comprising an emitter) may broadcast a light beam and the sensor may absorb reflected IR light sensing the presence of an object presumed to be a user that recently authenticated. An array microphone may sense voice patterns that remain consistent with regard to a user that recently authenticated and/or may uniquely identify a user based on a sensed voice print. A camera may uses object and pattern recognition to identify a user. Other sensor inputs could be included as well such as an accelerometer or GPS.

The computing device 301 may comprise a processor 302, the co-processor 303, a medium 304, and a memory 305.

The processor 302 may include or otherwise be associated with dedicated registers, stacks, queues, etc. that are used to execute program code and/or one or more of these elements may be shared there between. In some embodiments, the processor 302 may comprise an integrated circuit. The processor 302 may comprise circuitry to perform a method such as, but not limited to, the method described with respect to FIG. 1.

The coprocessor 303 may used to supplement the functions of the processor 302. The coprocessor 303 may comprise circuitry to perform a method such as, but not limited to, the method described with respect to FIG. 1. Furthermore, to save the processor 302 from unnecessary traffic, the coprocessor 303 may receive sensor signals from the sensor array 310 since the processor 302 may only need to receive a signal to indicate a start of a UPS and a termination of the UPS. Therefore, by having the coprocessor 303 handle sensor communications, the processor 302 may not be overloaded.

Besides receiving information from one or more of the plurality of sensors, the coprocessor 303 may aggregate the varied types sensor data to produce a composite assertion of a user presence expressed in terms of user's proximity to the computing device and in terms of its association with the user authentication event since each sensor may detect a user presence in a unique manner (e.g., facial recognition, amount of infrared energy, detection of a Bluetooth device, etc.). The coprocessor 303 may receive power state control signals in addition to internally generated power state controls and the coprocessor 303 may monitor power state transitions looking for patterns that indicate an unacceptable risk to USP continuity. If UPS continuity is lost, then the coprocessor 303 may report a UPS state change to an authentication module (also executed by the coprocessor 303) which may respond by re-authenticating a user at a next appropriate opportunity, such as when a computing device transitions to an operational state.

In some embodiments, a UPS sensor driver processes context from multiple inputs and determines an accuracy of the input. In other embodiments, the coprocessor 303 may function as a user presence sensor to produce a binary signal indicating a user presence status (either present or not present). The coprocessor 303 may include proximity in terms of distance that the user is from the sensor array 310 as well as an estimated accuracy of the determination indicating a user presence status. The coprocessor 303 may also provide information such as what sensors were used in the computation. The coprocessor 303 and/or sensor hub 310 may implement a human presence algorithm where an accuracy of a user presence may be improved by combining independently computed presence values from one or more of the sensors 306/307/308/309. In some embodiments, power management logic associated with the coprocessor 303 and the sensor hub 310 can be coordinated to optimize reliability of human presence within a defined area (e.g., space) around the computing device 301. For example, a user may be detected within circular bands (e.g., a radius from the computing device 301) at millimeter, centimeter, or meter range distances. In some embodiments, a user presence policy can be shaped such as a vector that is to the front, back, right, left, top, bottom of the computing device 301 where a user is determined to be present. Furthermore, the range in millimeters, centimeters, or meter distances may be determined.

The medium 304 may comprise any computer-readable medium that may store processor-executable instructions to be executed by the processor 302. For example, the medium 304 may comprise a non-transitory tangible medium such as, but is not limited to, a compact disk, a digital video disk, flash memory, optical storage, random access memory, read only memory, or magnetic media.

The memory 305 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM).

Various modifications and changes may be made to the foregoing embodiments without departing from the broader spirit and scope set forth in the appended claims.

What is claimed is:

1. A non-transitory computer-readable medium comprising instructions that, when executed by a processor, configure the processor to perform a method, the method comprising:
   receiving a first signal from a sensor;
   determining that a user is present based on the received first signal;
   receiving a second signal from the sensor;
   determining if the user is still present based on the received second signal;
   determining, via a co-processor, an assertion based on a proximity vector that comprises an aggregated received first signal and received second signal; and
   receiving a third signal from a second sensor, and wherein the determining if the user is still present is based on the received second signal and the received third signal.

2. The medium of claim 1, wherein the method further comprises:
   signing the assertion to create a signed assertion, via the co-processor, the signed assertion comprising a machine specific code associated with the co-processor.

3. The medium of claim 2, wherein the method further comprises:
   combining the assertion with a time stamp, the time stamp associated with a refresh rate of the sensor.

4. The medium of claim 2, wherein the method further comprises:
   initiating, via a processor, a user presence session based on the determination that the user is present.

5. The medium of claim 2, wherein the method further comprises:
   receiving an indication associated with a user presence or a lack of user presence associated with the user, the user presence or lack of user presence being based on the signed assertion.

6. An apparatus comprising:
   a co-processor configured to:
      receive a first signal from a sensor;
      determine that a user is present based on the received first signal;
      receive a second signal from the sensor;
      determine if the user is still present based on the received second signal;

determine an assertion based on a proximity vector that comprises an aggregated received first signal and received second signal; and receive a third signal from a second sensor, wherein the determining if the user is still present is based on the received second signal and the received third signal, and a processor configured to:
receive the determination from the co-processor; and
initiate a user presence session based on the determination that the user is present.

7. The apparatus of claim 6, wherein the co-processor is to further:
sign the assertion to create a signed assertion, via a co-processor, the signed assertion comprising a machine specific code associated with the co-processor.

8. The apparatus of claim 7, wherein the co-processor is to further:
combine the assertion with a time stamp, the time stamp associated with a refresh rate of the sensor.

9. The apparatus of claim 7, wherein the processor is to receive an indication associated with a user presence or a lack of user presence associated with the user, the user presence or lack of user presence being based on the transmitted and signed assertion.

10. The apparatus of claim 7, wherein the received first signal and the received second signal contain a distance and vector pinpointing a user's presence relative to the apparatus.

\* \* \* \* \*